Dec. 22, 1964  G. L. ATTANASIO ETAL  3,162,704
MOLDING OF EXPANDABLE PLASTIC PELLETS
Filed Sept. 22, 1961  3 Sheets-Sheet 2

INVENTORS.
GINO L. ATTANASIO
FRANK H. LAMBERT
BY
James and Franklin
ATTORNEYS

Dec. 22, 1964  G. L. ATTANASIO ETAL  3,162,704
MOLDING OF EXPANDABLE PLASTIC PELLETS
Filed Sept. 22, 1961  3 Sheets-Sheet 3

INVENTORS.
GINO L. ATTANASIO
BY FRANK H. LAMBERT
James and Franklin
ATTORNEYS

United States Patent Office

3,162,704
Patented Dec. 22, 1964

3,162,704
MOLDING OF EXPANDABLE PLASTIC PELLETS
Gino L. Attanasio, Nice, France, and Frank H. Lambert, Pompton Lakes, N.J., assignors to Champlain-Zapata Plastics Machinery, Inc., Roseland, N.J.
Filed Sept. 22, 1961, Ser. No. 139,933
14 Claims. (Cl. 264—53)

This invention relates to the molding of expandable plastic pellets or so-called foam molding, and more particularly to an improved apparatus which combines both the expansion and the molding steps in the molding press.

Foam molding has grown in importance. Pellets of plastic material, typically polystyrene, are employed, the material having previously been charged with a propellant gas. When such pellets are heated and softened, the expansion of the propellant gas blows up each pellet into a much larger and very light weight bead. These beads are conveyed to a mold to fill the same, and there they are further heated to cause them to fuse or coalesce, and to provide a smooth skin for the molded article. The mold is chilled, and the then hardened product is removed from the mold.

The prevailing practice with shaped molds is to pre-expand the pellets, although that occasions considerable difficulty, particularly when attempting to mold in repeated molding cycles. Steam is used for pre-expansion, but the beads should be dry to insure a free flow to the mold. When dried, static electricity may be generated and cause the beads to stick. Pressure causes the expanded beads to collapse during transfer, and mold filling therefore has been by means of dry compressed air used as an aspirating medium to suck rather than to push the beads. If the compressed air is obstructed, the resulting change from suction to pressure may cause the beads to stick and obstruct passageways, as well as to collapse.

The volume of the expanded beads requires pre-expansion apparatus and storage apparatus of very large size, and the conduits for handling and transferring the beads to the molding presses must be of large diameter. All equipment is thus made bulky and space-consuming.

The primary object of the present invention is to overcome the foregoing difficulties and to instead make it possible to use raw pellets directly at the mold in a repeated molding cycle. The pellets are expanded in the shaped mold. This cannot be done simply by loading a supply of pellets in a mold and heating the same, because such pellets will simply fuse together in one part of the mold. Instead, agitation and free flow and dispersion of the beads throughout the mold cavity are required if the mold is to be filled with expanded beads at substantially uniform density. Separate pre-expansion has therefore been thought essential.

In accordance with the present invention a desired small quantity of pellets which, when expanded, will fill the mold, is measured out and put into a small heated chamber located immediately adjacent and in valved connection with the shaped mold. This chamber is subjected to air pressure which exceeds the expansion pressure of the pellets, thereby preventing expansion of the pellets into beads, despite their raised temperature. Polystyrene, for example, is heated to a temperature which softens the polystyrene, but the temperature is not high enough for the beads to fuse together. Meanwhile, the mold is kept at a very low pressure. When the valve between the heated pressure chamber and the mold is opened, the heated pellets rush abruptly into the mold where they are free to expand and fill the mold.

A further object of the invention is to provide apparatus which is well adapted to automatic operation in repeated cycles.

In accordance with another feature and object of the invention, the compressed air is supplied to the heated chamber in jets at the end of the chamber remote from the mold, so that the compressed air itself serves to eject the pellets into the mold, and to disperse the same in the mold. With the same object in view, the configurations of the valve and heated chamber are so selected as to encourage fast and complete discharge and dispersal of the pellets.

Still another object is to provide automatic measuring and transfer means for the charges of raw pellets, and further to heat insulate the transfer means from the heated chamber in order to guard against premature heating and possible sticking of the pellets.

To accomplish the foregoing general objects, and other more specific objects which will hereinafter appear, the invention resides in the apparatus elements for foam molding, and their relation one to another, as are hereinafter more particularly described in the following specification. The specification is accompanied by drawings in which.

Figure 1:
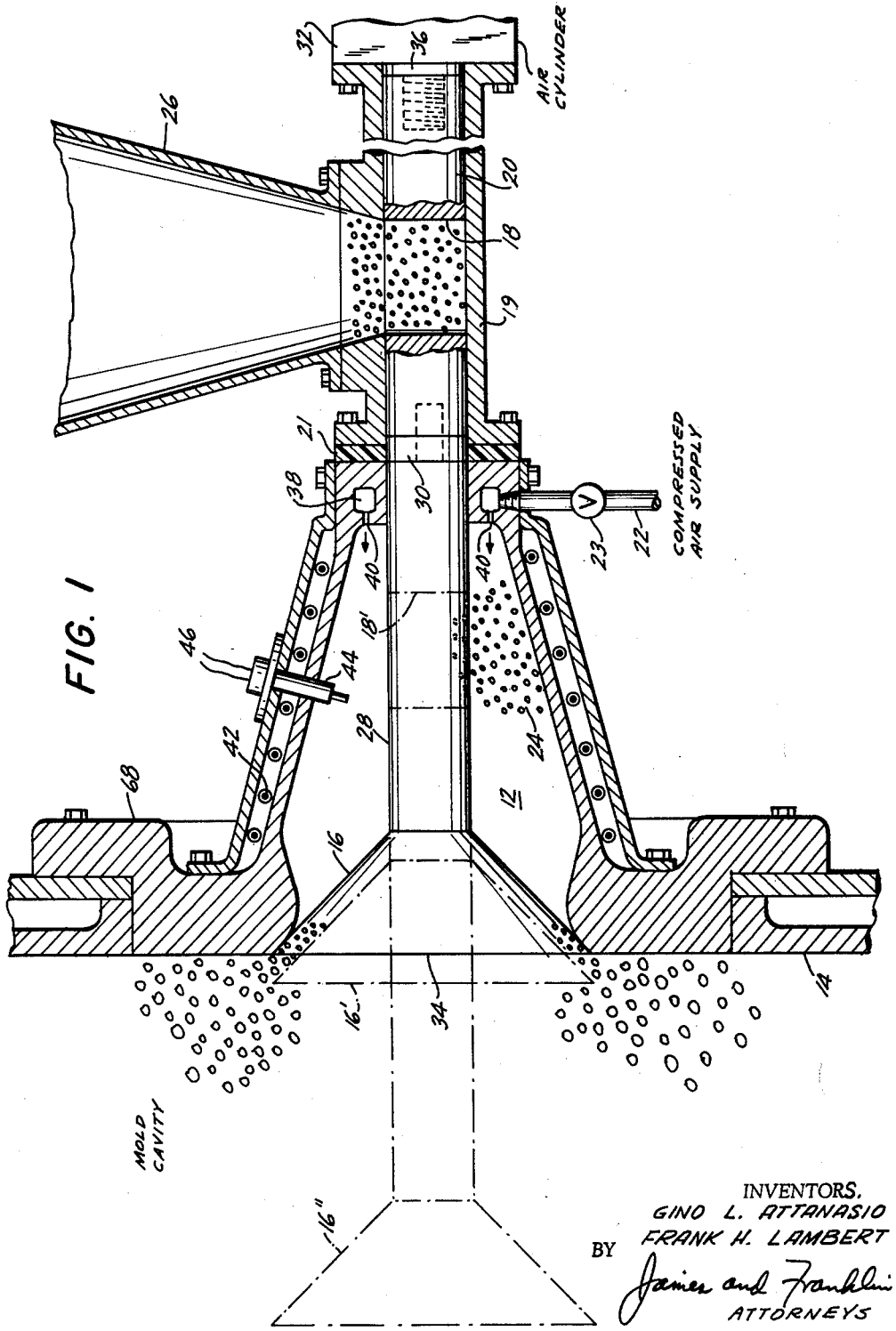
FIG. 1 is a vertical section through one form of apparatus embodying features of the invention.

Referring to the drawing, and more particularly to FIG. 1, the apparatus there shown comprises a small heated chamber 12 located immediately adjacent and in communication with a mold cavity, one wall of which is indicated at 14. A valve 16 is disposed between the chamber 12 and the mold. There is also a means 18 to measure a desired quantity of raw pellets which, when expanded, will fill the mold cavity. There is also a means 20 to transfer the measured pellets to the chamber 12. Compressed air is supplied through a pipe 22 to the chamber 12, and the air pressure is sufficiently high to prevent expansion of the pellets into beads despite their raised temperature. Inasmuch as the mold is at a very low pressure, say atmospheric or a vacuum, on opening of the valve 16, as shown by the change from the solid line position to the broken line position 16', the heated pellets 24 rush abruptly into the mold where they are free to expand.

The pellets are preferably loaded into a hopper 26 disposed over the transfer slide 20. The chamber 12 is circular in cross section, and the valve 16 is mounted at the inner end of a valve stem 28 which passes coaxially through the chamber 12, as clearly shown in the drawing.

The transfer slide 20 is in this case an extension of the valve stem 28, but a section of heat insulating material 30 is preferably inserted between the parts 20 and 28, so that heat from chamber 12 will not be carried back to the measuring cavity 18, where it might prematurely soften and fuse the pellets. The valve is actuated in any desired fashion, and in the present case there is an air cylinder the inner end of which is shown at 32. This provides either a short or a long opening stroke for the valve. The short stroke from position 16 to 16' is used to eject the pellets from chamber 12 into the mold cavity, whereupon the valve is quickly retracted and remains closed, so that the inner face 34 of the valve may act as a part of the mold surface.

After the mold has been cooled, and the product set, the mold may be widely opened by means of a molding press, and the product removed. The actuator 32 may move the valve over its long stroke, indicated by the change from the solid line position 16 to the broken line position 16″. The valve may additionally serve as an ejector to help eject the molded piece from the mold, if not already removed. In any event, the long stroke moves the measuring cavity from the solid line position 18 to its broken line position 18′ where it is well inside the chamber, and its contents fall into the chamber as indicated at 24.

Figure 6:
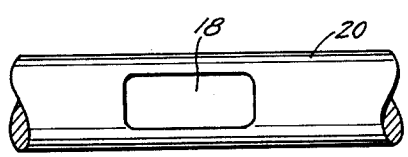
FIG. 6 is a fragmentary plan view, explanatory of a detail of the apparatus shown in FIG. 1.

The measuring cavity 18 is a passage through the slide 20, as will be clear also from inspection of FIG. 6, which is a top view showing how cavity 18 is cut through the slide rod 20. It will be understood that when a mold of different volume is employed, the measuring cavity must be changed in dimension, and for this purpose the part 20 between the piston rod at one end, and the valve rod 28 at the other end, is changed. Alternatively a single slide may be employed, with a plurality of removable bushings of graduated size which telescope one inside the other to provide a smaller or larger cavity as desired.

The compressed air supplied to pipe 22 is preferably connected to a distributing ring or manifold 33 at the end of the chamber remote from the mold. A ring of holes 40 lead to the manifold 38, and these holes provide air jets which are directed lengthwise of the chamber 12, so that the compressed air itself serves to blow the pellets out of the chamber and into the mold. At this time the mold itself is "cracked open" slightly at its parting face. To facilitate the flow of pellets the chamber is shaped generally divergently toward the mold, and the valve 16 is frusto-conical, and also divergent toward the mold. The small end of the valve merges into the valve stem 28 in order not to obstruct the free discharge of pellets from the chamber.

It is important to control the temperature to which the pellets are heated, and for this purpose electrical heating of chamber 12 is convenient. In the present case it is heated by heating coils indicated at 42, and the resulting temperature is controlled by a temperature-responsive probe 44, connected through leads 46 to appropriate circuitry to automatically regulate the temperature, and to hold it at a desired value. In simplest form a thermostat may turn the heating circuit on and off as needed.

The transfer slide 20 moves in a sleeve 19 which is preferably heat-insulated from chamber 12, as by means of the insulating material shown at 21. This combines with the insulating material 30 to guard against premature heating of the raw pellets.

Figure 4:
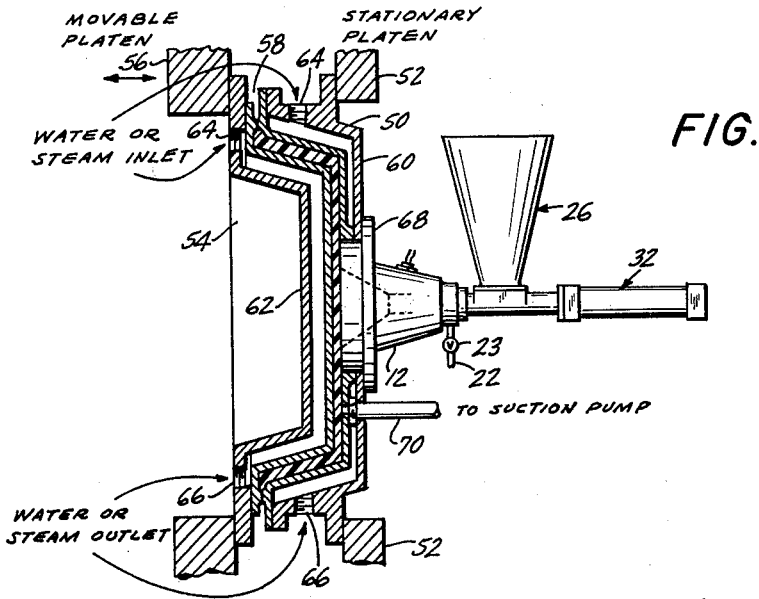
FIG. 4 is a vertical section through a shaped mold combined with the apparatus shown in FIG. 1.

The mold itself may be of a known type used for foam molding, and arranged for heating and cooling in alternation. Such an arrangement is schematically represented in FIG. 4, in which the stationary part 50 of a mold is secured to a stationary press platen 52. The movable part 54 of the mold is secured to a movable press platen 56. The platens preferably hold the mold in vertical position, and are moved horizontally, so that the parting face of the mold, shown at 58, is vertical. Both halves of the mold are jacketed, as shown at 60 and 62, and these jackets have inlets 64 and outlets 66 for steam or water, that is, flexible hoses from the mold are connected to a valve system which facilitates the supply of steam to the mold when it is being heated, and the subsequent supply of water instead of steam, when it is being cooled. While not here shown, it may be mentioned that frequently tiny holes or very thin slits are provided through the inner wall of the jacket, so that some of the steam may be admitted to the beads in the mold in order to help expand the same.

The apparatus described in connection with FIG. 1 is shown mounted on the mold at 68, and the parts 12, 22, 26 and 32 all correspond to the similarly numbered parts in FIG. 1.

In addition, the mold may, if desired, the provided with another connection at 70, and this is piped to a suction pump in order to at least partially evacuate the mold. This is not essential, but it is a refinement which much further reduces the pressure in the mold, and therefore increases the explosive effect with which the pellets rush into the mold cavity, and there expand.

When a suction connection is used the mold is not cracked open. Moreover, the supply of compressed air to pipe 22 is cut off completely (or may be reduced to a very small value) as at valve 23, simultaneously with the opening of the main valve 16. The rush of pellets from the pressure chamber to the mold then is caused primarily by suction rather than pressure, although the expansion of the highly compressed air content in the heated chamber itself will act to aid the ejection and dispersion of the pellets.

A modified form of the invention may be described with reference to FIGS. 2 and 3 of the drawing. There again is a small chamber 72 immediately adjacent a mold one wall of which is shown at 74. The chamber is normally sealed from the mold cavity by means of a valve 76. This merges smoothly into a valve stem 78, which passes coaxially through chamber 72, and which leads to suitable operating mechanism, typically an air actuator connected to the valve stem. The valve is normally urged closed by a compression spring 80, and in the present case, the valve opens by retraction into the chamber, as shown by the broken line position 76′. For this purpose, the chamber may be convergent for at least a short distance near the mold, and the other end is preferably convergent as before, as shown at 82. Compressed air is supplied through a pipe 84 and leads to an annular ring or manifold 86 having a series of air passages 88.

Again the chamber is heated, preferably by electrical heating coils 90, and the temperature is accurately regulated by a temperature-responsive probe 92 having leads connected to circuitry for automatic regulation of the temperature. The chamber 72 is preferably encased in heat-insulating walls 94, and 96, for efficiency, and also to help prevent premature heating of the pellets.

Figure 3:
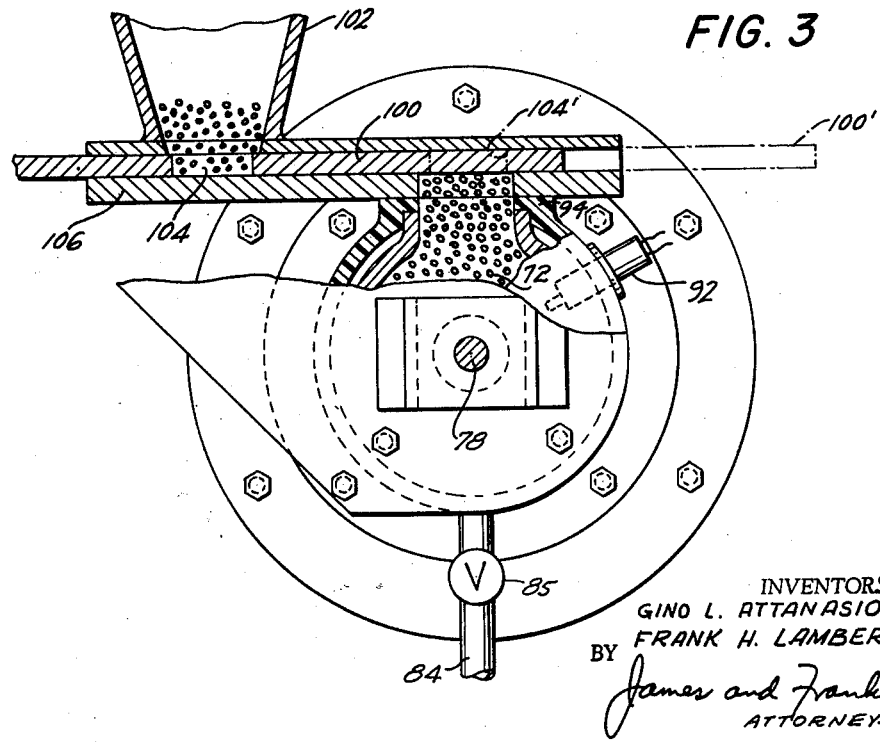
FIG. 3 is a transverse section through the apparatus shown in FIG. 2.

Referring now to FIG. 3 there is a measuring and transfer slide 100 which is disposed above the chamber 72, and there is a hopper 102 disposed above the slide 100. In the present case the slide moves in a direction transversely of the valve stem 78. The measuring cavity in slide 100 is shown at 104, and in the retracted position of the slide, the cavity 104 is beneath the hopper 102, and fills with raw pellets. Meanwhile the imperforate end of the slide over the chamber 72 seals it against loss of pressure. When the slide is advanced from the solid line position 100 to the broken line position 100′, the measuring cavity 104 moves to the broken line position 104′, over the top of the measuring chamber, where the charge of raw pellets falls into the chamber. The slide then is retracted to the position 100.

The heat insulation at 94 helps protect the slide support 106 from the elevated temperature of the chamber, and this also protects the slide 100. However, if desired, additional precautions may be taken, including, for example, the use of material of poor heat conductivity for the slide 100. A phenolic plastic laminate may be used, or other heat insulating plastic of stable dimension.

Figure 5:
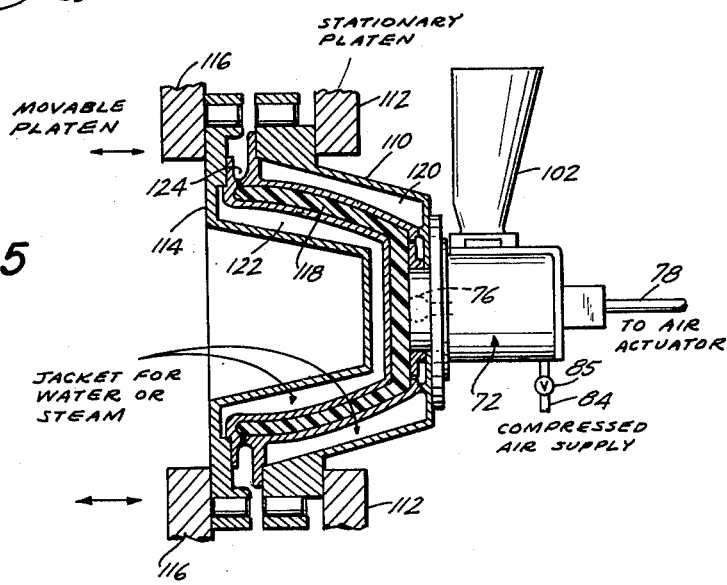
FIG. 5 is a vertical section through a different shaped mold combined with the apparatus shown in FIGS. 2 and 3.

This form of the invention is shown applied to a mold in FIG. 5, which incidentally illustrates a mold of different configuration. In this case the stationary mold 110 is secured to the stationary platen 112 of a molding press, while the movable part 114 of the mold is secured to the movable platen 116 of said molding press. The piece being molded is indicated at 118, and the stationary mold is jacketed at 120, while the movable mold is jacketed at 122. Although the connections are not shown, it will be understood that in this case, as in FIG. 4, there are inlets and outlets for piping or hose connections for steam and water in alternation. The parts shown at 72, 78, 84 and 102 all correspond to the similarly numbered parts in FIGS. 2 and 3.

No suction pipe connection is shown, and instead the press is arranged to not only close or open, but also to provide a position in which the mold is cracked slightly open at the parting face, indicated at 124. Thus the interior of the mold is at atmospheric pressure when the valve 76 is opened. The flow of compressed air toward and through the peripheral slit at the parting face 124 encourages distribution and dispersion of pellets throughout the mold cavity. The compressed air supply then is stopped, as at valve 85, and the mold fully closed.

It will be understood that for a different size mold cavity the measuring chamber 104 may be different, and for this purpose a series of slides 100 may be provided with different size measuring cavities. Alternatively, graduated telescopic bushings may be employed to vary the effective size of the measuring cavity in a single slide.

Figure 2:
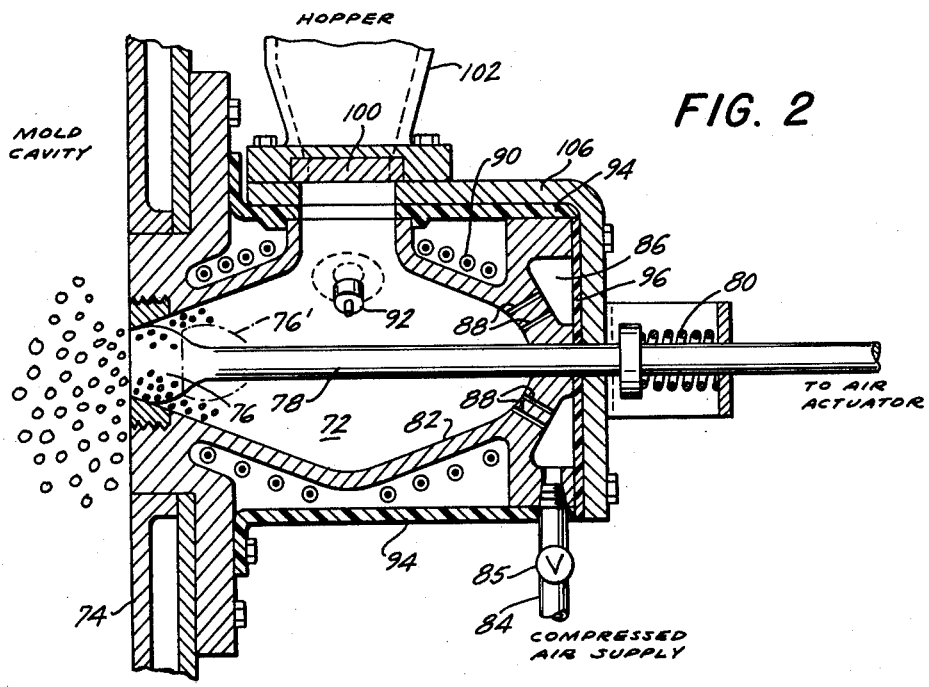
FIG. 2 is a similar vertical section through a different form of apparatus.

It will be understood that the mold configurations shown in FIGS. 4 and 5 have been selected at random, and that the apparatus of FIG. 1 may be used with the mold of FIG. 5, and conversely the apparatus of FIG. 2 may be used with the mold of FIG. 4, instead of being combined as shown. Moreover, the illustration of suction applied to FIG. 4 again is arbitrary, and it will be understood that the simpler procedure of cracking the mold open may be used in FIG. 4 as well as in FIG. 5, and conversely, if thought desirable a suction connection may be used in FIG. 5 as well as in FIG. 4.

It is believed that the construction and method of use of the improved foam molding apparatus, as well as the advantages thereof will be apparent from the foregoing description. The pellets are heated to the softening point, but expansion is prevented by holding the pellets under a pressure greater than the expansion pressure. When expansion is wanted, the pressure is abruptly released, and the propellant gas in the pellets rapidly expands them into beads of much larger size. The temperature of the chamber is accurately controlled so that the pellets are not fused to each other. The pellets must remain in a freely flowable state, and must be transferred at high speed so that they are all inside the mold before they have time to expand a substantial amount. With a particular polystyrene material called "Styropor" the desired temperature is from 160° to 177° F. However, the temperature may vary slightly with different makes of expandable polystyrene, and different grades.

The shapes of the chamber and of the valve are designed to encourage fast flow from the chamber into the mold cavity, and also to insure full emptying of the chamber so that cleaning of the chamber is not needed. For this same purpose the interior may be chromium plated to give it a high polish. Alternatively, it may be coated with a film of Teflon or other self-lubricating material, but this introduces the disadvantage of reduced heat transfer.

The air pressure selected must be adequate to resist expansion of the pellets. However, it should not be made greatly excessive, because at its other extreme the pressure may become great enough to inhibit expansion of the pellets even in the mold, and with this same precaution in view, the air jet passages 40 in FIG. 1, and 88 in FIG. 2 may be limited in cross-section, so that the rate of air supply will not exceed the rate of escape through the cracked open parting face of the mold. Moreover, the air pressure is preferably cut off promptly after transfer of the pellets.

In practice the chamber is emptied in less than half of one second, and this is faster than the time needed for expansion of the beads.

The surrounding apparatus for operating the mold and valves and transfer slide has not been shown in detail, but may make use of conventional elements such as actuators, limit switches and relays. The arrangement of FIG. 2 in which the transfer slide is independent of the valve has the advantage that the timing of the machine may deliver a new supply of pellets to the chamber as soon as the old supply has been ejected and the valve again closed, and thus the new supply may be heated while the previous supply is going through the usual molding cycle in the mold. In the arrangement of FIG. 1 the delivery of the next supply of pellets follows completion of the previous molding cycle, and therefore the production rate with the arrangement of FIG. 2 may be made higher than with the arrangement of FIG. 1.

The present apparatus eliminates separate pre-expansion with its consequent storage and delivery problems. The expansion here is a single stage expansion because the expansion takes place in the mold itself. Even the preliminary heating takes place immediately adjacent the mold in a heating chamber which for all practical purposes, may be said to form a part of the mold.

With the present apparatus, and particularly when the article being molded does not require a very smooth skin, it is possible to reduce the necessary heating of the mold. In some cases it may be possible to eliminate heating of the mold. This in turn speeds the molding cycle, because it eliminates the need for alternately heating and cooling the mold, and instead it may be operated continuously in a moderately cooled condition. The practice will depend to large extent on the characteristics of the particular expandable beads being employed, some of which may require a higher temperature than others for adequate fusing together of the beads.

It will be understood that while the invention has been shown and described in several preferred forms, changes may be made in the structures shown without departing from the scope of the invention, as sought to be defined in the following claims.

What is claimed is:

1. A method of foam molding expandable plastic pellets which have previously been charged with a foaming agent, which method utilizes a mold and a small chamber located immediately adjacent and in valved connection with the mold, said method comprising
    (a) measuring a desired small quantity of the pellets which when expanded will fill the mold,
    (b) placing this measured quantity of pellets in the chamber,
    (c) heating the chamber and pellets therein to a predetermined temperature sufficient to normally cause the pellets to expand but not sufficient to cause the pellets to fuse together while
    (d) preventing expansion of the pellets despite their raised temperature by applying air to the chamber under a pressure at least as great as the expansion pressure of the pellets,
    (e) keeping the mold at a very low pressure,
    (f) transferring the heated pellets from the chamber into the mold by opening a valve between the chamber and the mold to permit the pellets to rush abruptly into the mold where they expand and fill and take the shape of the mold, and
    (g) further heating the pellets to fuse the same together.

2. A method of foam molding expandable plastic pellets which have previously been charged with a foaming agent, which method utilizes a mold and a small chamber located immediately adjacent and in valved connection with the mold, said method comprising
    (a) measuring a desired small quantity of the pellets which when expanded will fill the mold,
    (b) placing this measured quantity of pellets in the chamber,
    (c) heating the chamber and pellets therein to a predetermined temperature sufficient to normally cause the pellets to expand but not sufficient to cause the pellets to fuse together while (d) preventing expansion of the pellets despite their raised temperature by applying air to the chamber under a pressure at least as great as the expansion pressure of the pellets, (e) keeping the mold at a very low pressure by evacuating the mold, and (f) transferring the heated pellets from the chamber into the mold by opening a valve between the chamber and the mold while continuing the evacuation of the mold to cause the pellets to rush abruptly into the mold where they expand and fill and take the shape of the mold.

3. A method of foam molding expandable plastic pellets which have previously been charged with a foaming agent, which method utilizes a mold and a small chamber located immediately adjacent and in valved connection with the mold, said method comprising (a) measuring a desired small quantity of the pellets which when expanded will fill the mold, (b) placing this measured quantity of pellets in the chamber, (c) heating the chamber and pellets therein to a predetermined temperature sufficient to normally cause the pellets to expand but not sufficient to cause the pellets to fuse together while (d) preventing expansion of the pellets despite their raised temperature by applying air to the end of the chamber remote from the mold under a pressure at least as great as the expansion pressure of the pellets, (e) keeping the mold at a very low pressure by cracking the mold open at its parting face, and (f) transferring the heated pellets from the chamber into the mold by opening a valve between the chamber and the mold while maintaining the mold in cracked open position and while continuing the application of air under pressure to the remote end of the chamber to cause the pellets to rush abruptly into the mold where they expand and fill and take the shape of the mold.

4. A method of foam molding expandable plastic pellets which have previously been charged with a foaming agent, which method utilizes a mold and a small chamber located immediately adjacent and in valved connection with the mold, said method comprising (a) measuring a desired small quantity of the pellets which when expanded will fill the mold, (b) placing this measured quantity of pellets in the chamber, (c) heating the chamber and pellets therein to a predetermined temperature sufficient to normally cause the pellets to expand but not sufficient to cause the pellets to fuse together while (d) preventing expansion of the pellets despite their raised temperature by applying air to the chamber under a pressure at least as great as the expansion pressure of the pellets, (e) keeping the mold at a very low pressure, (f) transferring the heated pellets from the chamber into the mold by opening a valve between the chamber and the mold to permit the pellets to rush abruptly into the mold where they expand and fill and take the shape of the mold while (g) heating the mold during transfer of the pellets and thereafter to fuse the same together, (h) then cooling the mold to harden the fused molded pellets, and (i) removing the same from the mold preparatory to the next molding operation.

5. Apparatus for foam molding expandable plastic pellets which have previously been charged with a foaming agent, said apparatus comprising (a) a mold having a mold cavity of predetermined shape therein, (b) means operatively associated with said mold for successively heating and cooling the same, (c) a small chamber adapted to receive unexpanded pellets therein and being disposed immediately adjacent said mold and communicating with said mold cavity, (d) valve means disposed between said chamber and said mold cavity to control the communication thereof, (e) means communicating with said chamber for delivering a measured quantity of unexpanded pellets thereto which when expanded will fill said mold cavity, (f) heating means operatively associated with said chamber for heating the same and any pellets therein to a predetermined temperature corresponding to the temperature at which the pellets would normally expand but not fuse together, (g) means communicating with said chamber for supplying air thereto under a predetermined pressure corresponding at least to the expansion pressure of heated pellets for preventing expansion of the pellets in said chamber despite their raised temperature, (h) means operatively connected to said valve means for opening said valve means in timed relation to the heating of said chamber by said heating means, and (i) means operatively associated with said mold for keeping the mold cavity therein at very low pressure to permit the heated pellets to rush abruptly into the mold upon opening of said valve means.

6. Apparatus according to claim 5 wherein said means (i) for keeping said mold cavity at low pressure comprises suction means for evacuating said mold cavity.

7. Apparatus according to claim 5 wherein said mold includes two mold sections relatively movable between open, cracked open and closed positions, and wherein said means (i) for keeping said mold cavity at low pressure comprises means for moving said mold sections to cracked open position.

8. Apparatus according to claim 7 wherein said air supplying means (g) communicates with said chamber at a point remote from the point at which said chamber communicates with said mold cavity and is operable simultaneously with said valve opening means so that the air supplied to said chamber aids in the transfer of the heated pellets from the chamber into the mold cavity.

9. Apparatus for foam molding expandable plastic pellets which have previously been charged with a foaming agent, said apparatus comprising (a) a mold having a mold cavity of predetermined shape therein, (b) means operatively associated with said mold for successively heating and cooling the same, (c) a small elongate chamber adapted to receive unexpanded pellets therein and being mounted directly on said mold and communicating at one end thereof with said mold cavity, (d) valve means disposed between said chamber and said mold cavity to control the communication thereof and having a relatively large diameter to permit substantial communication of said chamber and said mold cavity, (e) means communicating with said chamber for delivering a measured quantity of unexpanded pellets thereto which when expanded will fill said mold cavity, (f) heating means operatively associated with said chamber for heating the same and any pellets therein, (g) temperature responsive control means operatively associated with said chamber and connected to said heating means for controlling the temperature to which said chamber is heated to correspond to the temperature at which the pellets would normally expand but not fuse together, (h) means communicating with said chamber for supplying air thereto under a predetermined pressure corresponding at least to the expansion pressure of heated pellets for preventing expansion of the pellets in said chamber despite their raised temperature, (i) means operatively connected to said valve means for opening the same in timed relation to the heating of said chamber by said heating means, and (j) means operatively associated with said mold for keeping the mold cavity therein at very low pressure to permit the heated pellets to rush abruptly into the mold upon opening of said valve means.

10. Foam molding apparatus as defined in claim 9 in which the chamber is circular in cross section, and in which said valve means comprises a valve mounted at the inner end of a valve stem which passes through the chamber, and in which the valve and stem and chamber are coaxial.

11. Foam molding apparatus as defined in claim 9 in which said chamber is generally divergent toward the mold, and in which said valve means comprises a frusto-conical valve which is divergent toward the mold and which closes the large end of the chamber, and the small end of the frusto-conical valve merging into a valve stem in order not to obstruct the discharge of the pellets from the chamber into the mold when the valve is open.

12. Foam molding apparatus as defined in claim 9 in which said chamber is convergent toward both ends, and in which said valve means comprises a valve of large diameter having its rearward end merging into a valve stem in order not to obstruct free discharge of pellets from the chamber into the mold when the valve is in open position, and in which the valve is opened by retraction into the chamber.

13. Apparatus according to claim 9 wherein said means (e) for delivering a measured quantity of pellets to said chamber comprises (1) a hopper adapted to contain a supply of unexpanded pellets therein and being mounted adjacent to and heat insulated from said chamber, (2) a slide having a cavity of predetermined size therein and movable between a first position wherein said cavity communicates with said hopper for receiving a measured quantity of unexpanded pellets therefrom and a second position wherein said cavity communicates with said chamber, and (3) actuator means connected to said slide and operable in timed relation to the operation of said valve means for moving said slide.

14. Apparatus according to claim 13 wherein said valve means comprises a valve carried by the inner end of a valve stem which passes through said chamber, and wherein said slide comprises a portion of said valve stem and said actuator means for said slide is also the actuator means for said valve means.

References Cited in the file of this patent

UNITED STATES PATENTS

| | | |
|---|---|---|
| 1,922,448 | Miner | Aug. 15, 1933 |
| 2,309,729 | Gordon | Feb. 2, 1943 |
| 2,660,564 | Davis | Nov. 24, 1953 |
| 2,838,801 | Delong et al. | June 17, 1958 |
| 2,841,824 | Harvey | July 8, 1958 |
| 2,900,109 | Hoopes et al. | Aug. 18, 1959 |
| 2,950,505 | Frank | Aug. 30, 1960 |
| 2,951,260 | Harrison et al. | Sept. 6, 1960 |

FOREIGN PATENTS

| | | |
|---|---|---|
| 623,812 | Canada | July 11, 1961 |
| 1,252,136 | France | Dec. 19, 1960 |